(12) United States Patent
Tsuboi et al.

(10) Patent No.: US 7,030,518 B2
(45) Date of Patent: Apr. 18, 2006

(54) POSITION-CONTROL STAGE WITH ONBOARD LINEAR MOTOR

(75) Inventors: Takaaki Tsuboi, Kanagawa-ken (JP);
Eiji Ida, Kanagawa-ken (JP);
Yoshihiko Kanazawa, Osaka-fu (JP)

(73) Assignee: Nippon Thompson Co., Ltd., Tokyo (JP)

(*) Notice: Subject to any disclaimer, the term of this patent is extended or adjusted under 35 U.S.C. 154(b) by 60 days.

(21) Appl. No.: 10/621,409

(22) Filed: Jul. 18, 2003

(65) Prior Publication Data

US 2004/0061383 A1  Apr. 1, 2004

(30) Foreign Application Priority Data

Aug. 9, 2002 (JP) ............................. 2002-232274

(51) Int. Cl.
*H02K 41/00* (2006.01)

(52) U.S. Cl. ...................................................... 310/12

(58) Field of Classification Search ............. 310/12–14
See application file for complete search history.

(56) References Cited

U.S. PATENT DOCUMENTS

| | | | | |
|---|---|---|---|---|
| 2,719,931 A | * | 10/1955 | Kober | 310/156.49 |
| 4,430,802 A | * | 2/1984 | Cole | 33/203.12 |
| 5,208,501 A | * | 5/1993 | Wright | 310/75 C |
| 5,530,303 A | * | 6/1996 | Takei | 310/12 |
| 5,684,344 A | * | 11/1997 | Takei | 310/12 |
| 5,936,319 A | * | 8/1999 | Chitayat | 310/12 |
| 6,552,449 B1 | * | 4/2003 | Tsuboi et al. | 310/12 |

FOREIGN PATENT DOCUMENTS

| | | |
|---|---|---|
| JP | 108960/1983 | 6/1983 |
| JP | 91710/1993 | 4/1993 |
| JP | 130765/1993 | 5/1993 |
| JP | 99766/1995 | 4/1995 |
| JP | 2001-352744 | 12/2001 |
| JP | 2002-328191 | 11/2002 |
| JP | 2002-341076 | 11/2002 |

* cited by examiner

*Primary Examiner*—Darren Schuberg
*Assistant Examiner*—Judson H. Jones
(74) *Attorney, Agent, or Firm*—Browdy and Neimark, PLLC

(57) ABSTRACT

A position-control stage is disclosed which makes it possible to extend largely an angular movement in circular direction for position control, rendering the stage itself compact in construction, allowing to work with high precision in clean environment and further produce the stage with inexpensive cost. The position-control stage has an onboard linear motor composed of armature windings of primary side and field magnets of secondary side. The armature windings are each made in a hollow rectangle where winding turns are wound in the form of flat loop, and are circularly arranged on a disc surface of the bed along a preselected curvature in such a way lying in radial juxtaposition in circumferential direction. The field magnets are made in a flat shape and arranged underneath the turntable in such a pattern lying radially on a disc surface of the preselected curvature in opposition to the armature windings, with their unlike poles alternating in polarity along a circular direction.

7 Claims, 10 Drawing Sheets

(A)

(B)

(C)

POSITION-CONTROL STAGE WITH ONBOARD LINEAR MOTOR

BACKGROUND OF THE INVENTION

1. Field of the Invention

The present invention relates to a position-control stage with onboard linear motor, which has been extensively used in machinery including semiconductor and liquid display manufacturing equipment, measuring instruments, assembling machines, tool machines, industrial robots, conveyors and, more particularly, to a position-control stage in which an armature coil is installed in, for example, a stationary bed while a field magnet lies on a turntable.

2. Description of the Prior Art

In recent years, current multi-axis stages and moving mechanisms such as X-Y plotters employed in the diverse technical fields using machinery as stated earlier have required more and more a slider unit, which is made compact or slim in construction and light in weight, and moreover able to operate with high propulsion, high speed and high response to provide high speed travel and precise position control for works, tools, articles and instruments. Linear motors commonly used in the slider units involve two broad types. The first, called moving-coil linear motor has a plurality of moving-armature coils. The second, called moving-magnet linear motor has many moving-field magnets of permanent magnet.

In Japanese Patent Laid-Open No. 2001-352744, there is disclosed a slider unit with onboard moving-magnet linear motor, which is able to move in linear direction. The slider unit is made compact in construction and improved in allowing the slider to travel linearly with high speed and high response relatively to the stationary bed, and thereby helping provide the precise position control of the slider with respect to the stationary bed. In the prior slider unit disclosed in the above citation, the armature assembly is constructed operating on a three-phase current system, and the driving circuit is installed outside the slider unit, instead of inside the slider unit, to make the stationary bed simple in construction and reduced in overall height. The field magnet is made of rare earth magnet, for example neodymium magnet, which is high in flux density to produce the high propulsion to force the table with high velocity. With the prior slider unit stated earlier, the encoder to monitor the table position relatively to the bed is constructed with an optical encoder having therein a linear scale, which is effective in keeping the slider unit low in the occurrence of dust and dirt, thus ensuring clean environment.

Another Japanese Patent Laid-Open No. 99766/1995 disclosed a driver unit constructed in a circular configuration having a preselected curvature. A linear motor built in the driver unit is provided therein with armature windings lying on a flat and circular bed in close relation with one another, each of the armature windings being wound in a form of substantially hollow rectangle, and sheets of field magnet extending with a preselected curvature as a whole underneath a circular table turning relatively to the bed, each of the field magnet sheets having 5 poles arranged to alternate circularly in polarity. Nevertheless, the driver unit constructed as stated earlier, because there is no center of turning inside the driver unit, is tough in arrangement and difficult to use. Moreover, the prior driver unit is not ready for position-control stages because the field magnets should be arranged with large radius of curvatures.

A commutator linear motor is disclosed in Japanese Patent Laid-Open No. 108960/1983, which is comprised of field magnetic poles lying circularly on a substrate pivoted for angular movement, the field magnetic poles being magnetized with unlike N-pole and S-pole in a way alternating circularly in polarity, and armature windings arranged circularly on a printed-circuit board in opposition to the field magnetic poles, the armature windings being wound in a form of sector. With the commutator linear motor stated earlier, both the field magnetic poles and the armature windings have to be made into the same sector or trapezoid that fits precisely with any desired curvature. Thus, the prior construction is hardly suited to every desired radius of curvature.

Another Japanese Patent Laid-Open No. 91710/1993, moreover, disclosed a motor for swinging motion, which is comprised of a stator yoke for field magnet having mounted thereon with four sectors of permanent magnet, and a rotor substrate for armature winding having mounted thereon four sectors of winding, the stator yoke being flanked by rotor substrates with a somewhat air gap remaining between the stator yoke and any of the rotor substrates. Like the prior circular linear motor recited previously, the prior motor for swinging motion constructed as stated earlier is also hardly suited to every desired radius of curvature, because both the field magnets and the armature windings must be made into the same sector of any desired curvature.

A linear motor suited to any curvilinear way is disclosed in Japanese Patent Laid-Open No. 130765/1993, in which the primary side is constituted with concentrated windings which are laid around the teeth of more than one iron core arranged in piles. The concentrated windings fit on a yoke having a desired radius of curvature, and thereby complete any winding set having the core therein. However, this sort of linear motor would become bulky in dimension.

Meanwhile, production systems linked with semiconductors, for example semiconductor manufacturing equipment, measuring instruments, assembling machines, and so on can advance greatly in years and correspondingly makes a growing demand for high-accurate angular position control stage that can operate with high precision, high speed, high propulsion, high response and clean environment, even with made far compact or slim in construction and far inexpensive in production cost, compared with the conventional slider unit.

In Japanese Patent Laid-Open No. 2002-328191, which was filed for a senior invention of the same applicant as in the present application, there is disclosed a stage system with onboard linear motor where the table is allowed to move angularly over just a tiny angle in circular direction. With the senior stage system recited just above, the table is flanked with a linear motor that is arranged in a way extending out of the table in line with a tangent of the table. Tiny angular position control of the table is made by virtue of the linear motor. The prior stage system has been successful, to some extent, in shrinkage and thinning in structure and improvement in response. The stage system is comprised of a first stage lying on a base stage for linear movement in an X-direction relatively to the base stage, a second stage lying on the first stage for linear movement relatively to the first stage in a Y-direction crossing the X-direction, a turning stage supported on the second stage through a rolling-contact bearing, and a linear motor causing the turning stage to move angularly towards any desired position over a tiny angle in circular direction. The linear motor is made up of the primary side of armature windings arranged lengthwise on any one side of the second stage, and a secondary side of a field magnet on which unlike poles a alternate lengthwise in polarity.

Japanese Patent Laid-Open No. 2002-341076, also filed for another senior invention of the same applicant as in the present application discloses a table system with angular position control, which can move precisely an object in circular direction over any tiny angle, even with made reduced in height and compact or slim in construction. With the table system with angular position control disclosed in just above citation, a table supported on a bed for rotation through a crossed-roller bearing can be moved over a tiny angle in circular direction with a driving means through an arm extending radially from the table. A nut and screw set causes a linear motion that is in line with a tangent of the table, and the linear motion is translated into a circular motion to turn the table in any circular direction by virtue of a combination of a first linear motion guide unit interposed between the bed and a carriage to control the linear motion in the tangential direction, a bearing means interposed between the carriage and a turret means, and a second linear motion guide unit to control a linear motion in the direction that looks towards the center of the table. Nevertheless, the table system with angular position control constructed as stated earlier, because of having no onboard linear motor, could not be made less in height by any means. Thus, problems are parts or components are complicated in construction and position control lacks for precision.

Thus, it remains a major challenge to provide a slider unit advancing in conduction system for armature windings, selection of material for field magnet and fixture construction of sensor cords to make the slider unit less in weight, compact and simple in construction, far more precise in position control of the table relatively to the bed, large in angle allowed for angular movement in circular direction upon position control, reduced in height as low as possible, and inexpensive in production cost.

SUMMARY OF THE INVENTION

The present invention, therefore, has as its primary object to overcome the subject as described just above and more particular to provide a position-control stage with onboard linear motor in which the armature windings and the field magnets are arranged in opposition to each other, any one for any of the turntable and the bed, the other for the residual one, thereby making it possible to extend largely an angular movement in circular direction for position control, rendering the position-control stage itself reduced in overall height, compact and simple in construction, allowing the position-control stage to work with high precision in clean environment and further produce the stage with inexpensive cost.

The present invention is concerned with a position-control stage; comprising a bed, a turntable supported for rotation on the bed through a rolling-contact bearing, a linear motor moving the turntable relatively to the bed in a circular direction, and an encoder monitoring a relative position of the turntable to the bed; wherein the linear motor is comprised of armature windings of primary side and field magnets of secondary side; wherein the armature windings are each made of a three-phase coreless coil where winding turns are wound in a form of flat rectangular loop, and are circularly arranged on a disc surface of the bed along a preselected curvature in such a way lying in radial juxtaposition in circumferential direction; and wherein the field magnets are made in a flat shape and arranged underneath the turntable in such a pattern lying radially on a disc surface of the preselected curvature in opposition to the armature windings, with their unlike poles alternating in polarity along a circular direction.

In an aspect of the present invention, a position-control stage is disclosed in which the armature windings are each made in a shape of hollow rectangle while the field magnets are each made in a shape of solid rectangle, and armature windings and the field magnets are juxtaposed respectively, with a spacing between any adjacent two increasing in circular direction as a radial distance becomes larger.

In another aspect of the present invention a position-control stage is disclosed in which the linear motor in minimum unit is comprised of three armature windings and five field magnets.

In another aspect of the present invention, a position-control stage is disclosed in which there is provided a pair of the linear motors made in minimum unit in case where the position-control stage requires less circular angle in relative turning of the turntable to the bed. In case where the position-control stage requires large circular angle in relative turning of the turntable to the bed, as an alternative, there is provided a position-control stage in which the field magnets are disposed on the disc surface of the turntable throughout an overall circular direction while the armature windings lie on the disc surface of the bed over a preselected area in the circular direction.

In another aspect of the present invention, a position-control stage is disclosed in which the field magnets fit successively in a circular recess cut in an underside of the turntable, and the armature windings lie circularly on a coil support that fits in a circular recess sunken below a top surface of the bed.

In a further another aspect of the present invention, a position-control stage is disclosed in which a linear encoder to monitor any turning position of the turntable relative to the bed is comprised of an optical linear scale surrounding around an outside periphery of the turntable, and a sensor arranged on the bed.

In another aspect of the present invention, a position-control stage is disclosed in which an origin mark is affixed to the underside of the turntable in opposition to the sensor of the bed at a preselected position in the circular direction.

In another aspect of the present invention, a position-control stage is disclosed in which a stopper extends below the underside of the turntable while another stopper extends above the top surface of the bed, so that the turntable stops turning after the stopper has come into abutment against the another stopper, and a before-the-origin sensor and a limit sensor are installed short of the another stopper on the bed to detect when the stopper on the turntable reaches the sensors.

In another aspect of the present invention, a position-control stage is disclosed in which the turntable is made at a center thereof with an opening for looking into the interior to form a circular support where the turntable is supported for rotation on another circular support of the bed through the rolling-contact bearing. Moreover, the rolling-contact bearing is abutted at an inner ring thereof against a circular shoulder formed around an outside periphery of the circular support of the turntable, and forced against the turntable with a retainer, while the rolling-contact bearing is also abutted at an outer ring thereof against an another circular shoulder formed around an inside periphery of the another circular support of the bed, and held against the bed with another retainer.

In a further another aspect of the present invention, a position-control stage is disclosed in which there are provided a power line to convey electric power to the armature windings, a sensor line to signal to the sensors on the bed, and a signal line to receive any signal from the limit sensor and the before-the-origin sensor, and the lines are all clumped together through a cord cover attached to the bed.

With the position-control stage constructed as stated earlier, the armature windings and the field magnets are arranged in opposition to each other, any one for any of the turntable and the bed, the other for the residual one, on a disc surface along a preselected curvature in circular direction. This construction of the present invention helps make it possible to extend largely an angular movement in circular direction for position control, thus allowing the turntable to move across wider angular area relatively to the stationary bed. In case where the position-control stage requires less circular angle in relative turning of the turntable to the bed, as an alternative, only a pair of the linear motors made in minimum unit including three armature windings and five field magnets is sufficient to make certain of precise position control in circular direction. The armature windings and the field magnets made in the shape of flat rectangle help make the position-control stage itself reduced as small as possible in the overall height. Moreover, the construction that the armature windings and the field magnets fit respectively in the circular recesses cut in the bed and the turntable contributes to even more reduction in height, making the stage itself compact and slim in structure, even with working precisely in clean environment. The armature windings and the field magnets in the present invention are more inexpensive in production because they are both made in the shape of rectangle.

By virtue of the construction that both the armature windings and the field magnets are disposed on the disc surface in circular direction as stated earlier, the position-control stage of the present invention is allowed to move the turntable over a wide angle for the position control in circular direction. The feature that the armature windings and the field magnets are both made in the shape of flat rectangle makes it possible to render the stage itself as small as possible in overall height, compact and simple in construction, even with helping provide precise position control in clean environment.

With the position-control stage in which the armature windings and the field magnets are both made in the shape of flat rectangle to exploit their advantage of much less costly production, the armature windings and the field magnets, as opposed to the prior slider unit in which the armature windings and the field magnets are both arranged linearly, are juxtaposed respectively in circular direction, with a spacing between any adjacent two increasing in circular direction as a radial distance becomes larger. This circular arrangement in which the armature windings of the field magnets, both made in the shape of rectangle, simply lie on the disc surfaces in circular direction figures out to accomplish the precise position control or precise angular position control, with even simple in construction.

DETAILED DESCRIPTION OF THE REFERRED EMBODIMENTS

Figure 1:
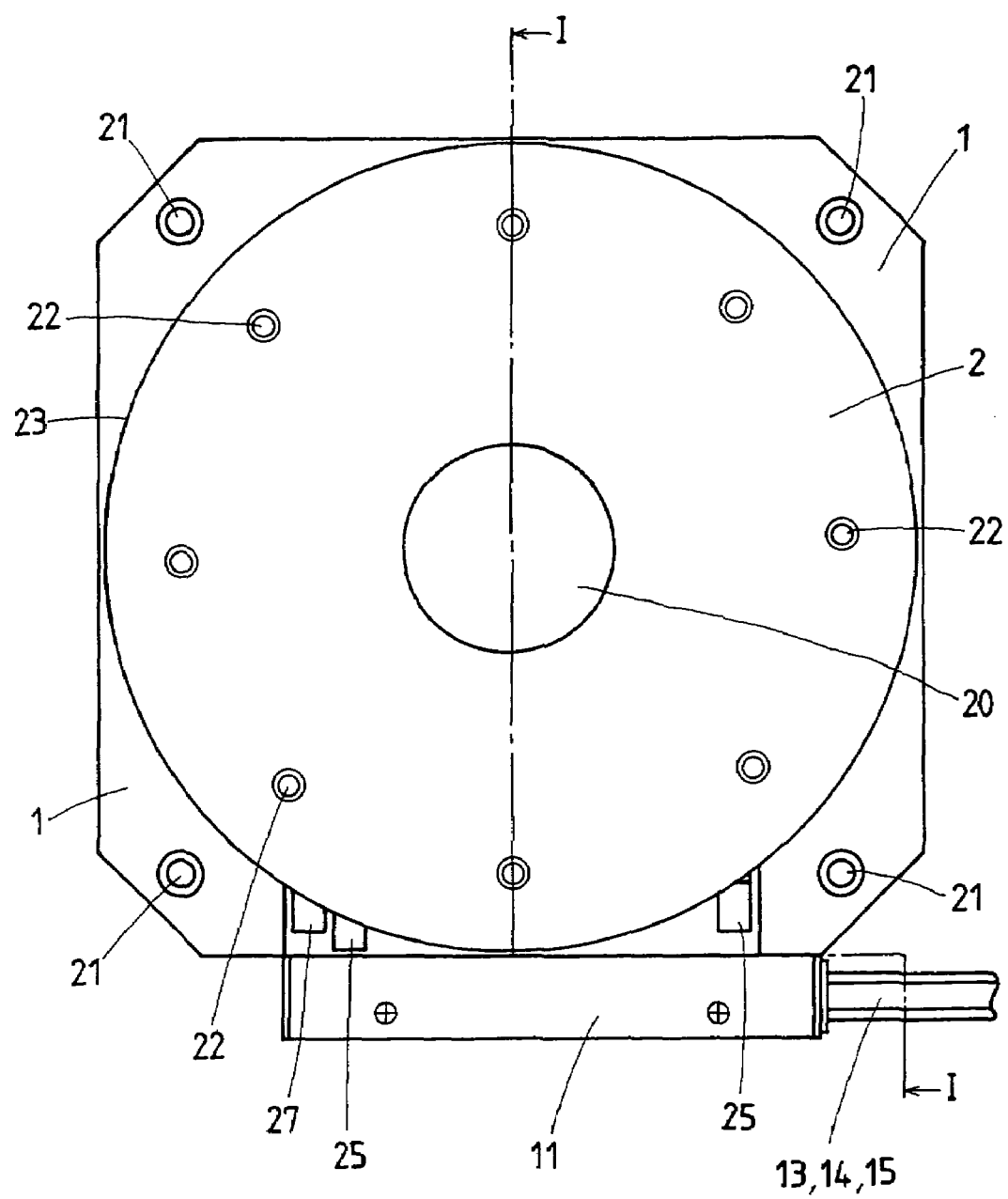
FIG. 1 is a plan view showing a preferred embodiment of a position-control stage with onboard linear motor in accordance with the present invention.

Preferred embodiments of a position-control with onboard linear motor according to the present invention will be explained hereinafter in detail with reference to the accompanying drawings.

The position-control stage of the present invention is designed to serve well for machinery including semiconductor and liquid display manufacturing equipment, measuring instruments assembling machines, tool machines, industrial robots, conveyors, and provided therein with onboard linear motor in which an armature winding 3 is installed in, for example, a stationary bed 1 while a field magnet 4 lies on a turntable 2. The position-control stage is used on a rectangular coordinate position control including X-Y stage means to provide angular position control, and is mainly composed of a bed 1 that is made at four corners thereof with bolt holes 21 used to fasten the bed 1 to any basement including a machine bed and so on, and a turntable 2 having holes 22 used to fasten any work thereto.

Referring to FIGS. 1 to 5 there is shown a first preferred embodiment of the position-control stage according to the present invention.

Figure 2:
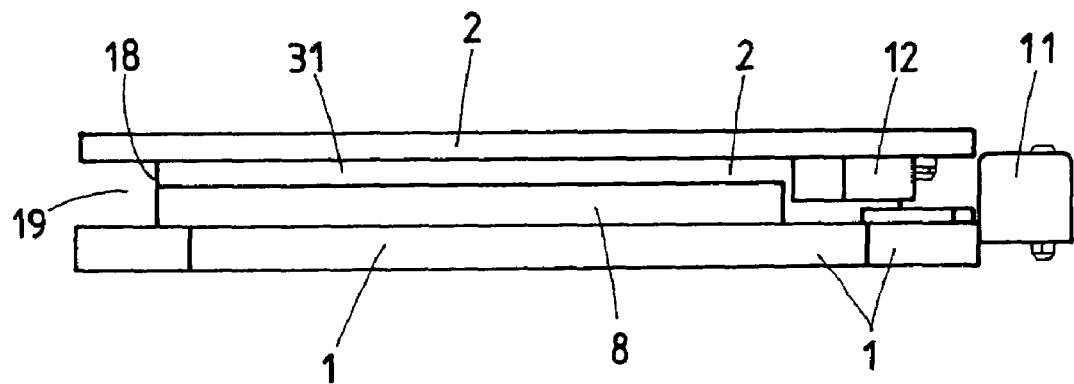
FIG. 2 is a side elevation of the position-control stage of FIG. 1, as seen from the left side thereof.
Figure 3:
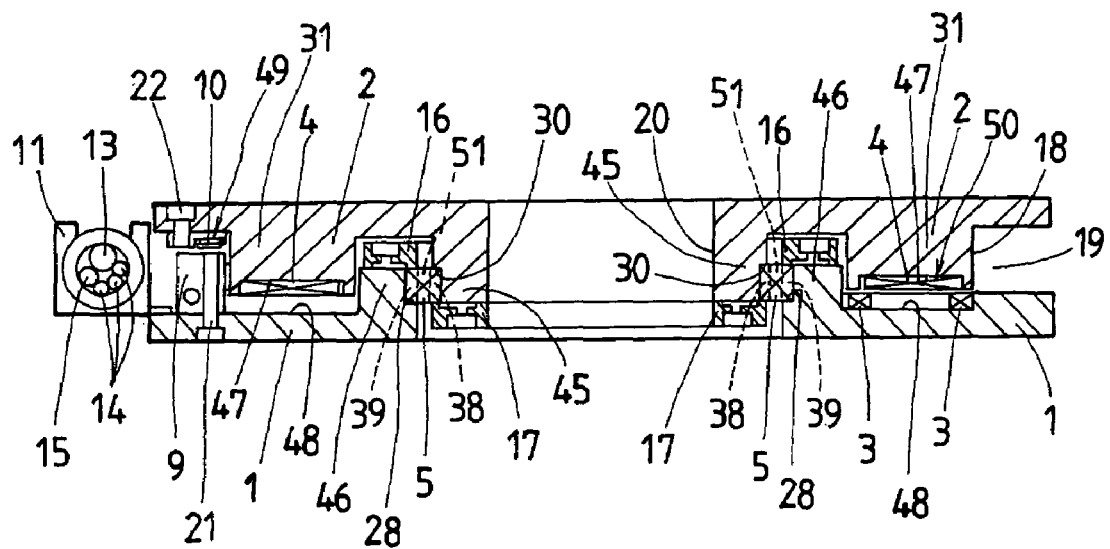
FIG. 3 is a cross-sectional view of the position-control stage of FIG. 1, the view being taken along the plane I—I of the same figure.

This position-control stage, especially shown in FIGS. 1 to 3, is comprised of a flat bed 1 of square plate, a turntable 2 of disc plate mounted for rotation on the bed 1 through a rolling-contact bearing 5 interposed between the bed 1 and the turntable 2, a linear motor 50 moving the turntable 2 relatively to the bed 1 in circular direction, and a linear encoder 49 monitoring an angular position or any relative position of the turntable 2 to the bed 1. The linear motor 50 is made up of a primary side of armature windings 3 and a secondary side of field magnets 4. The turntable 2 is defined in such a dimension that a circular periphery 23 thereof lies within a square periphery of the bed 1. Thus, the turntable 2 is designed to turn within an area of the bed 1.

Figure 4:
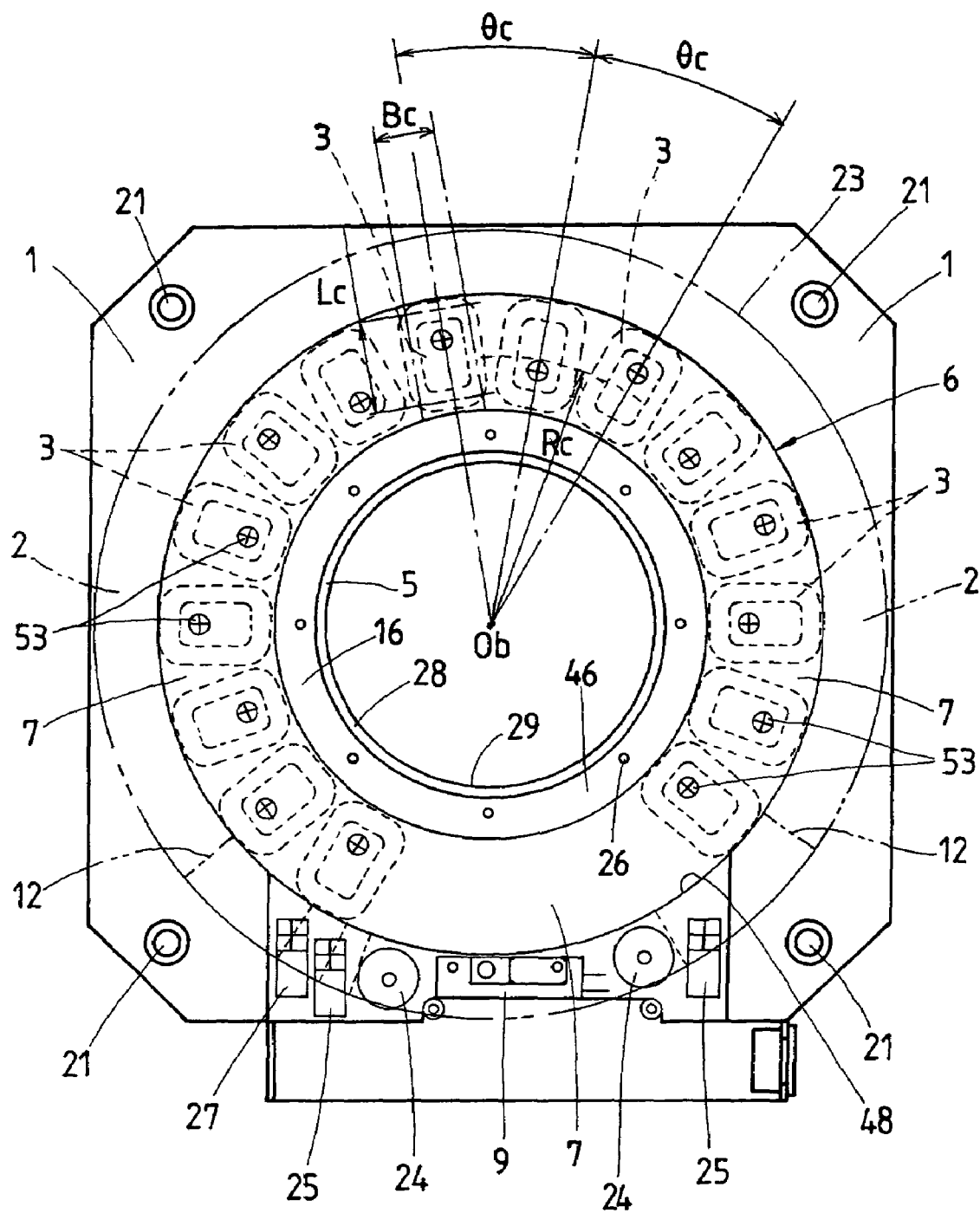
FIG. 4 is a plan view showing a bed of the position-control stage of FIG. 1, a turntable being removed to expose the construction on the bed.

As seen from FIGS. 3 and 4, the armature windings 3 providing the primary side of the linear motor 50 are each made of a three-phase coreless coil where winding turns are wound in the form of flat rectangular loop. The armature windings 3 are circularly arranged on a disc surface of the bed 1 along a preselected curvature in such a way lying in radial juxtaposition in circumferential direction over overall circular area or only any desired angular area. The armature windings 3 lie circularly on a coil support 7 that fits in a doughnut recess 48 sunken below a top surface of the bed 1, and are each secured to the coil support 7 with fastening screws 53, thereby completing a winding assembly 6. The bed 1 is made of magnetic material of steel suited for establishing magnetic path and thereby doubles as winding yoke to finish magnetic path in tandem with the winding assembly 6. An insulating sheet is interposed between the armature windings 3 and the doughnut recess 48. The bed 1 is made at the center thereof with an opening 29 for looking into the underneath of the bed 1. Around the opening 29 there is formed a circular support 46, an inside circular surface of which is radially set back with leaving a circular shoulder 28 against which an outer ring 39 of the rolling-contact bearing 5 is abutted with fitting in the setback.

The armature winding 3 has a core made of, for example resin molding around which the winding turns are laid. The armature winding 3 may be constructed, for example using the armature winding as recited in Japanese Patent Laid-Open No. 2001-352744, which was filed for a senior invention of the same applicant as in the present application. Each armature winding 3 lies radially on a disc surface along a preselected curvature in juxtaposition with one another in circumferential direction. The total number of the armature windings 3 is multipliers of 3. They are held on the coil support 7 to complete the winding assembly 6. With the first embodiment discussed now, there are arranged fifteen armature windings 3 on the bed 1.

Each armature winding 3 lying radially on a disc surface along a preselected curvature in circular direction, as shown in FIG. 4, is made in a rectangular configuration when seen in plan view, longer sides of which constitute two coil sides effective to induce the electromotive propulsion while shorter sides are coil ends that are invalid in electromotive propulsion. Now assuming that a widthwise distance between centerlines of circumferentially opposing longer sides is Bc while a lengthwise distance between centerlines of radially opposing shorter sides is Lc, each armature winding 3 is oriented and placed in such a way that a radial line extending through the middle of the widthwise distance Bc comes into alignment with the center Ob of the preselected curvature while an intersection of the radial line extending through the middle of the widthwise distance Bc with a circumferential line extending through the middle of the lengthwise distance Lc, or the center of the armature winding 3, falls in line with a preselected radius of curvature Rc. Moreover, any two adjacent armature windings 3 are arranged circularly in juxtaposition with a pitch of preselected angle θc where they lie closely to each other without lying on top of another.

Figure 5:
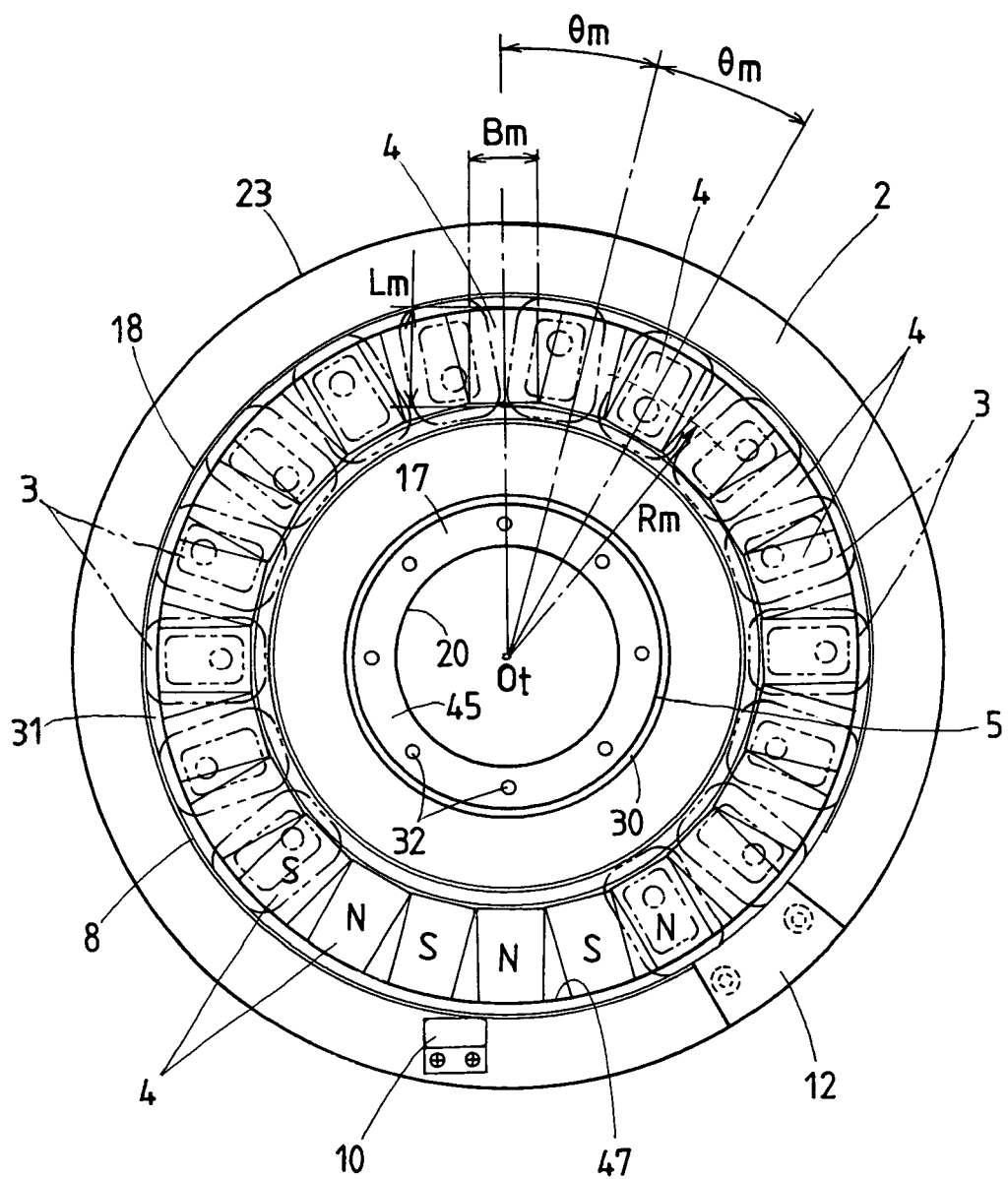
FIG. 5 is a bottom plan view of the turntable of the position-control stage shown in FIG. 1.

The field magnets 4 providing the secondary side of the linear motor, as shown in FIGS. 3 and 5, are made in the shape of rectangle and arranged underneath the turntable 2 in such a pattern lying radially on a disc surface of the preselected curvature in opposition to the armature windings 3, with their unlike poles, or N-pole and S-pole, alternating in polarity along the circular direction. With the first embodiment discussed here, the field magnets 4 are shown as lying in radial juxtaposition in circumferential direction over overall circular area. The field magnets 4 fit in a circular recess 47 like a doughnut in plan view, which is cut in the underside of the turntable 2. According to the first embodiment shown in FIG. 5, the field magnets 4 are arranged successively in circular direction and the total number of 24 poles is held underneath the turntable 2 either directly or indirectly through fixtures (refer to FIG. 7) used to fasten the field magnets 4. The field magnet 4 may be constructed, for example using the field magnet as recited in Japanese Patent Laid-Open No. 2001-352744, which was filed for a senior invention of the same applicant as in the present application. The turntable 2 is also made of magnetic material of steel suited for doubling as magnet yoke to complete magnetic path.

Underneath the turntable 2 there is provided a circular shoulder 18 extending downwards to define a central major body 31 of magnet yoke in which the field magnets 4 are secured. There is provided a linear scale 8 of optical linear encoder at a desired position around the periphery of the circular shoulder 18. A steel stopper 12 and an origin mark 10 are arranged in a circular space 19 left between the lower surface of the turntable 2 and the upper surface of the bed 1 around the periphery of the circular shoulder 18. The turntable 2 is made at the center thereof with an opening 20 for looking into the interior. Around the opening 20 there is formed a circular support 45, an outside circular surface of which is radially set back with leaving a circular shoulder 30 against which an inner ring 38 of the rolling-contact bearing 5 is abutted with fitting in the setback.

Each field magnet 4 lying radially on a disc surface along a preselected curvature in circular direction, as shown in FIG. 5, is made in a rectangular configuration when seen in plan view. Now assuming that a distance between shorter sides of the field magnet 4, or pole width is Bm while a distance between longer sides, or pole length is Lm, each field magnet 4 is oriented and placed in such a way that a radial line extending through the middle of the pole width Bm comes into alignment with the center Ot of the preselected curvature while an intersection of the radial line extending through the middle of the pole width Bm with a circumferential line extending through the middle of the pole length Lm, or the center of the field magnet 4, falls in line with a preselected radius of curvature Rm. Moreover, any two adjacent field magnets 4 are arranged circularly in juxtaposition with a pitch of preselected angle θm where they lie closely to each other without lying on top of another.

With the position-control stage of the present invention constructed as stated earlier, both the armature windings 3 and the field magnets 4 are in relation as will be stated below:

(1) The center of the turntable 2 tallies in geometry with the center Ot of the curvature preselected for the field magnets 4 while the center of the field magnets 4, or the center Ot of the curvature, is coincident with the center Ob of the curvature preselected for the armature windings 3. In addition, both the field magnets 4 and the armature windings 3 are arranged in a way having the same radius Rm=Rc of curvature.

(2) The pole width Bm of every field magnet 4 is identical with the widthwise distance Bc between centerlines of circumferentially opposing longer sides of every armature winding 3: Bm=Bc, while the pitch of preselected angle θm between successive armature windings 3 is equal to 4/3 times the pitch of preselected angle θc: θc=4/3 θm. In the first embodiment discussed here, θc=20° and θm=15°. Moreover, the pole length Lm of every field magnet 4 is about the same as the lengthwise distance Lc between centerlines of radially opposing shorter sides of every armature winding 3.

(3) The bed 1 used in the position-control stage discussed here are determined in dimensions of 200 mm in both the length and the width, and 30 mm in height. Moreover, the winding assembly 6 of the armature windings 3 is designed to be able to move over a moving angle θ of 280° in circular direction.

With the position-control stage constructed as stated earlier, the armature winding 3 and the field magnet 4, because of both being made in the shape of rectangle, are very easy and inexpensive to fabricate them. Making both the armature winding 3 and the field magnet 4 in the shape of rectangle causes the farther away the radius of the curvature is from the center of the curvature, the wider and more spaced away the clearance left between either any two adjacent armature windings 3 or any two adjacent field magnets 4 will become. In other words, every clearance between either any two adjacent armature windings 3 or any two adjacent field magnets 4 is left in the shape of isosceles triangle having its apogee lying on the radially inward sides of the associated armature windings 3 or field magnets 4. Even though the clearances are left between either any two adjacent armature windings 3 or any two adjacent field magnets 4, the position-control stage of the present invention can make sure of the turning torque efficient to move precisely the turntable 2 to any desired angular position over a required angle in circular direction. It will be preferred to make the winding yoke and the magnet yoke to establish the magnetic path, separately from the bed and the turntable, thereby producing both the bed and the turntable from light metals including aluminum to reduce the position-control stage itself in overall weight.

As seen from FIGS. 4 and 5, the linear motor 50 is comprised of the primary side of the armature windings 3 lying on the upper surface of the bed 1, and the secondary side of field magnets 4 arranged underneath the turntable 2 in opposition to the armature windings 3. The minimum unit needed for the linear motor 50 includes three pieces of armature windings and five poles of field magnet 4.

The circular support 45 surrounding around the opening 20 of the turntable 2 lies for rotation on another circular support 46 of the bed 1 through the rolling-contact bearing 5, which is constituted with a crossed-roller bearing that is large in load-carrying capacity, even with simple in construction. The inner ring 38 of the rolling-contact bearing 5 is abutted against the circular shoulder 30 formed around the outside periphery of the circular support 45 of the turntable 2, and forced against the turntable 2 with a retainer 17. The outer ring 39 of the rolling-contact bearing 5 is abutted against the circular shoulder 28 formed around the inside periphery of the circular support 46 of the bed 1, and held against the bed 1 with another retainer 16. The circular support 46 of the bed 1 has threaded holes 26 therein, which are used to fasten the outer ring 39 to the bed 1. With the crossed-roller bearing for the rolling-contact bearing, many rollers 51 are arranged circumferentially between the inner and outer rings 38, 39 with their axes intersecting alternately one another in such a manner that each roller can carry the turntable 2 against any load in every direction, either radial or axial.

A power line 13, a sensor line 15 and signal lines 14 are all drawn through a cord cover 11 attached to the bed 1. The power line 13 is used to convey electric power to the armature windings 3 while the sensor line 15 is to supply electric power to a sensor 9 and also receive any signal from the sensor 9. Moreover, the signal lines 14 will supply electric power to a limit sensor 25 and a before-the-origin sensor 27.

With the position-control stage of the present invention, as shown in FIGS. 2 and 4, the steel stopper 12 is held in the sidewise open area made underneath the turntable 2 around the circular shoulder 18 in a way extending downwards in the form of sector when seen in plan view. A pair of elastic stoppers 24 made of urethane rubber and so on, as seen in FIG. 4, lies on the bed 1 in the sidewise open area in a circular relation that any one circular ends of the steel stopper 12, after allowed to angularly move over any predetermined angle θ, for example 280° comes into collision against any associated one of the elastic stoppers 24, thereby keeping the turntable 2 against further circular movement. A pair of the limit sensors 25 is disposed near the elastic stoppers 24, one to each stopper, to warn any one of the stoppers 12 on the turntable 2 is drawing to the associated elastic stopper 24. It is to be noted that the limit sensors 25 is made in such a way the stoppers 12 are allowed to skim just over the limit sensors 25 without coming into collision against the sensors 25.

The linear encoder 49 to monitor any turning position of the turntable 2 relative to the bed 1 is comprised of a linear scale 8 surrounding around the outside periphery of the turntable 2, and a sensor 9 providing the optical linear encoder just opposite to the linear scale 8. The linear scale 8 for the linear encoder, as shown in FIG. 2, is fastened to the outside periphery of the circular shoulder 18 on the turntable 2 with the use of adhesives or the like. Moreover, the origin mark 10 is affixed to the underside of the turntable 2 in opposition to the top surface of the sensor 9 on the bed 1. The sensor 9 in the first embodiment shown in FIG. 4 is arranged in midway between the stoppers 24. The sensor 9 is constructed to signal the home position of the turntable 2 after having detected the origin mark 10, refer to FIG. 5, which is placed underneath the turntable 2 in opposition to the top surface of the sensor 9. With the position-control stage of the present invention, the turntable 2 may stop turning after any stopper 12 extending below the underside of the turntable 2 comes into collision against the associated elastic stopper 24 extending above the upper surface of the bed 1, so that the turntable 2 is protected from any excessively circular movement.

Moreover, the bed 1 has the before-the-origin sensor 27 short of the limit sensor. The bed 1 has the limit sensor 25 and the before-the-origin sensor 27 sensing any stopper 12 of the turntable 2 traveling through there, both the sensors being located short of the associated elastic stopper 24 on the bed 1. The before-the-origin sensor 27 is to detect any stopper 12 on the turntable 2 and designed in a way the stoppers 12 are allowed to skim just over the before-the-origin sensors 27 without coming into collision against the sensors.

Next refer to FIGS. 6 to 10, there is shown a second embodiment of the position-control stage with onboard linear motor according to the present invention. This second embodiment is envisaged to render it suitable for the position-control stage of the sort where the position control is small in circular angle, for example θ=±7°. In the second embodiment discussed below, the like reference numerals designate the components or parts identical or equivalent in function with that used in the first embodiment stated earlier, so that the previous description will be applicable.

Figure 6:
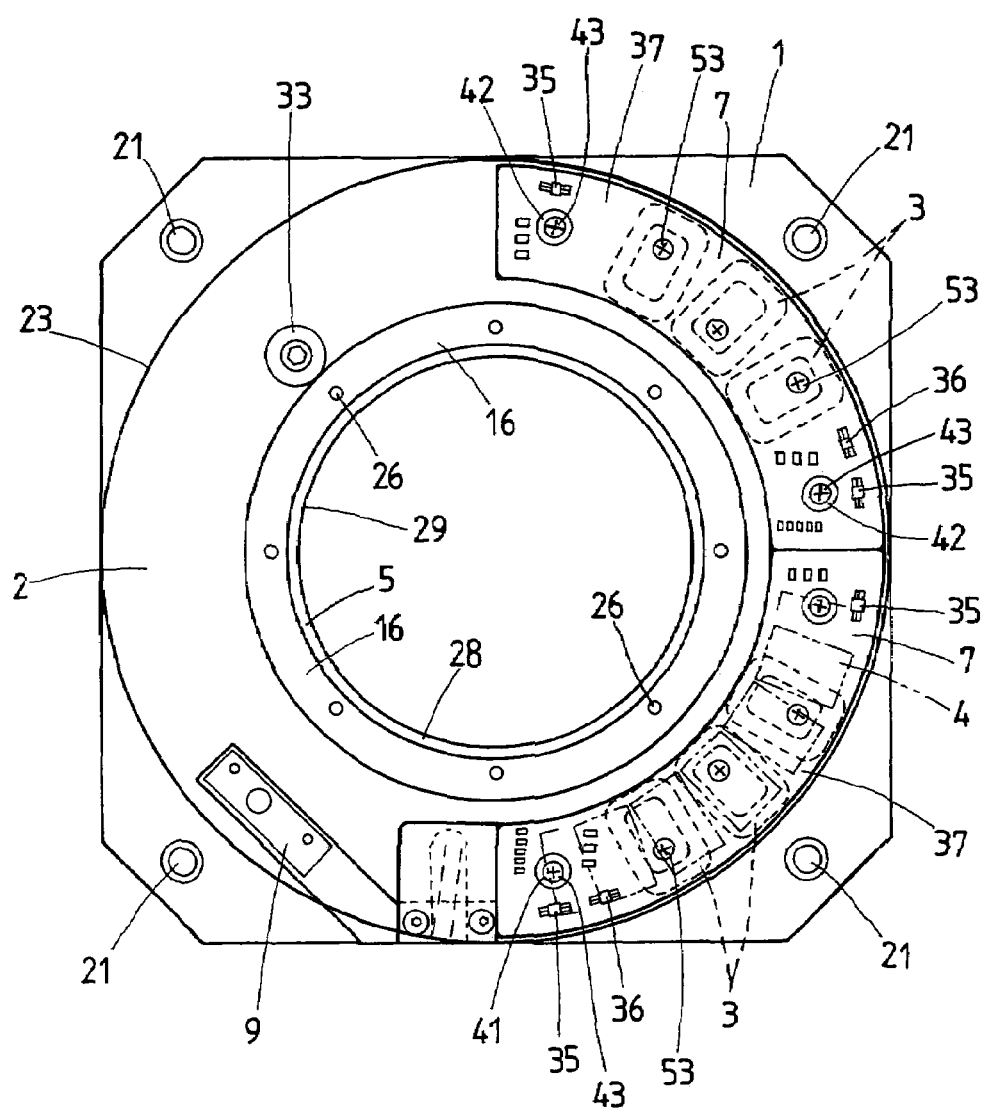
FIG. 6 is a plan view equivalent to FIG. 4 to show a second embodiment of the bed of the position-control stage, a turntable being removed to expose the construction on the bed.
Figure 7:
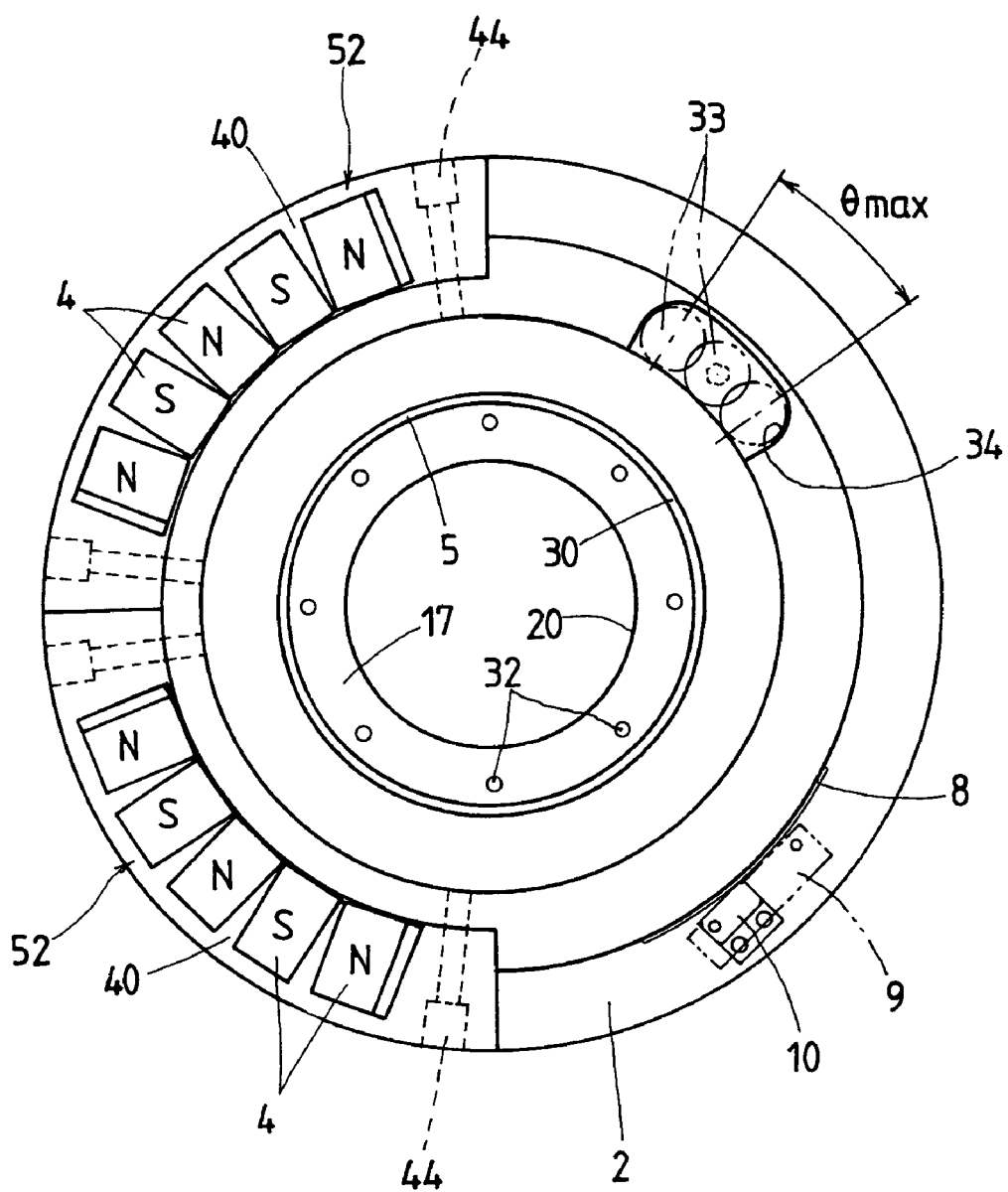
FIG. 7 is a bottom plan view equivalent to FIG. 5 to show a second embodiment of the turntable of the position-control stage.

The second embodiment of the position-control stage, as seen from FIGS. 6 and 7, has a pair of specific linear motors 50 of minimum unit to increase the torque to drive the turntable 2 relatively to the bed 1. The minimum unit of the linear motor 50 is comprised of three armature windings 3 and five field magnets 4. The three armature windings 3 are fastened to the coil support 7 of sector, for example a quadrant in FIG. 6, with some threaded bolts screwed into holes, refer to FIG. 10, which are used to fasten together the armature windings 3 to complete the winding assembly 37. The field magnets 4 consisting of five poles are each held to the turntable 2 to complete a field magnet assembly 52 through a magnet support 40 of sectorial configuration, for example a quarter of a circle as in FIG. 7, which is attached underneath of the turntable 2. It will be thus understood that a pair of field magnet supports 40 secured underneath the turntable 2 to lay the five poles of field magnet thereon lies in opposition to the paired coil supports 7 on each of which are secured three armature windings 3.

The limit sensor 35 and the before-the-origin sensor 36 used in the second embodiment, unlike the sensor elements in the first embodiment, are composed of Hall-effect elements, disclosed in for example Japanese Patent Laid-Open No. 2001-352744, which can issue a signal in response to magnetic flux created by any one of circumferentially outermost N-poles in the field magnets 4, which approaches the elements.

Means to stop the circular movement of the turntable 2 relative to the bed 1 is comprised of elastic stoppers 33 extending above the bed 1, and a recess 34 formed underneath the turntable 2 to receive the stoppers 33 therein. Moreover, the pitch of angle θc between successive armature windings 3 and the pitch of angle θm between successive poles are preselected respectively in, for example θc=16° and θm=12°.

Figure 8:
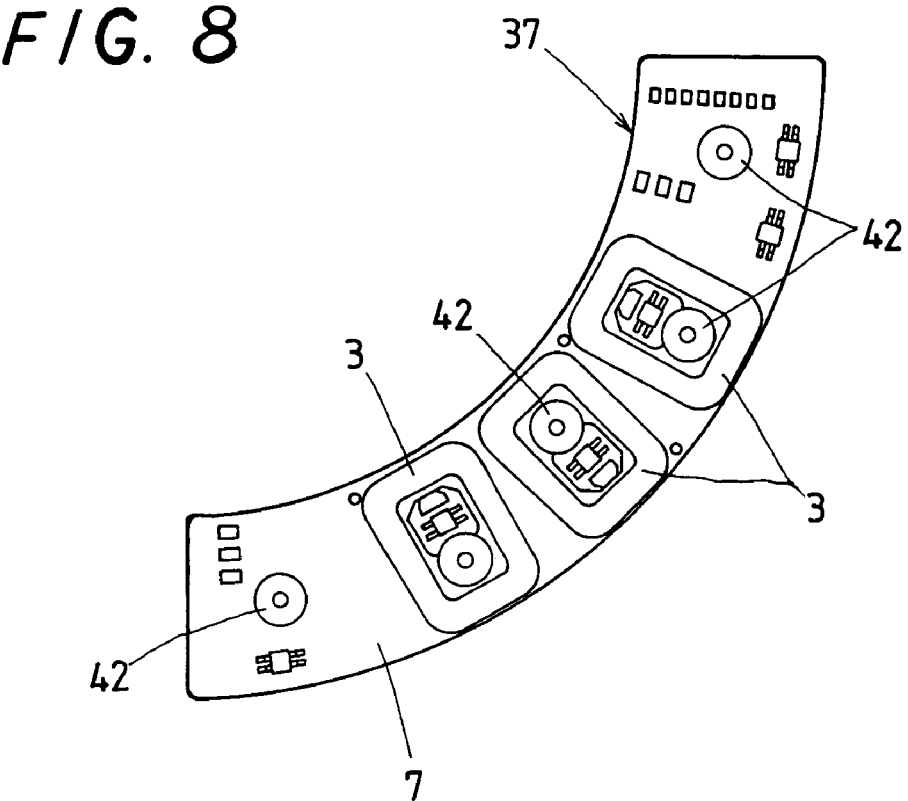
FIG. 8 is a bottom plan view of a winding assembly installed on the bed of FIG. 6.
Figure 9:
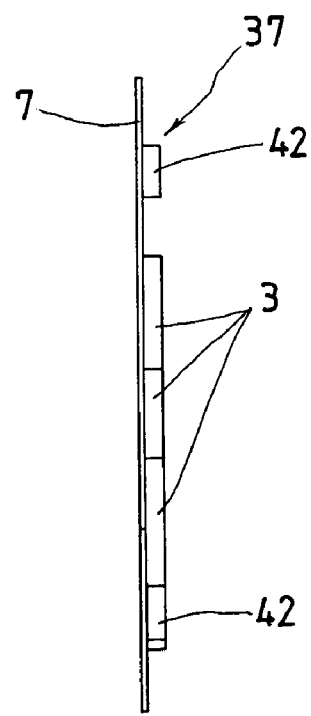
FIG. 9 is a side elevation of the winding assembly shown in FIG. 8.
Figure 10:
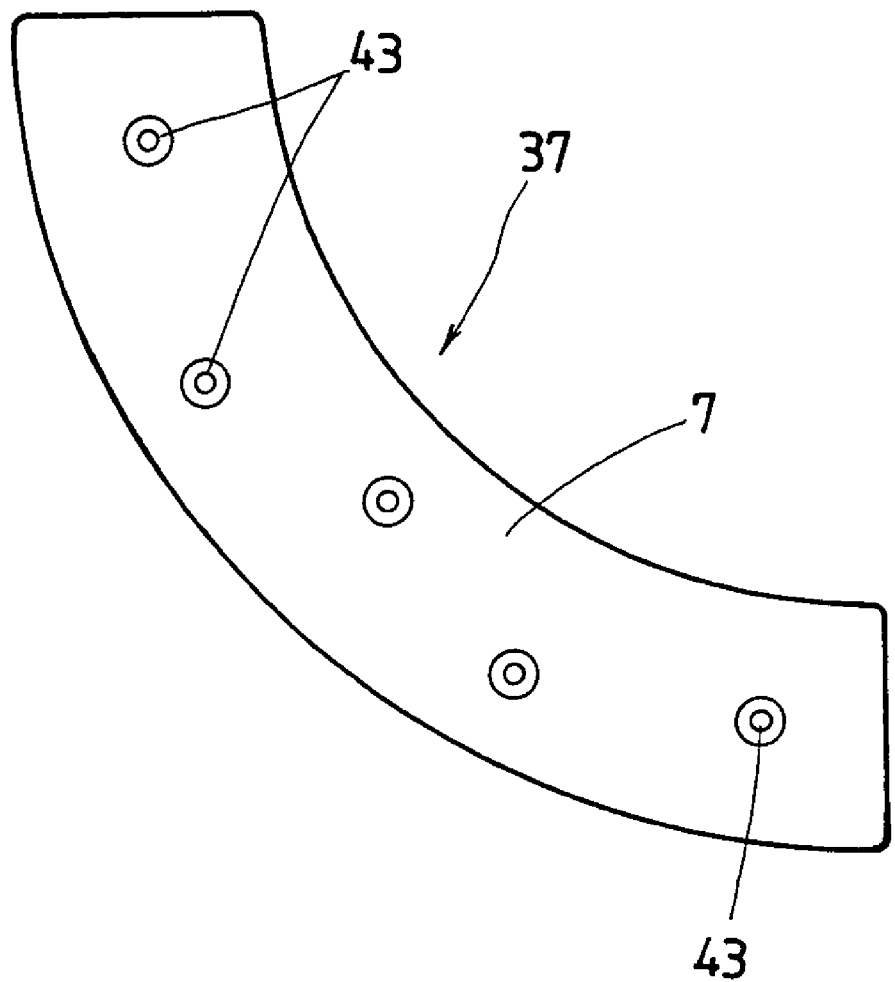
FIG. 10 is a rear elevation of the winding assembly of FIG. 8.

Referring to FIGS. 8 to 10, there is shown only the armature winding assembly 37 as in illustrated in FIG. 6, which has the armature windings 3 of the least in number needed to constitute the linear motor 50. The armature windings 3 are each made of a three-phase coreless coil where winding turns are wound in the form of flat rectangular loop. The armature windings 3 are circularly arranged on a disc surface of the bed 1 along a preselected curvature in such a way lying in radial juxtaposition in circumferential direction over the coil support 7. Each armature windings 3 are fastened to the coil support 7 using fastening screws 41 extending through bolt holes in the coil support 7 and collars 42 of the windings 3, which are laid in alignment with the bolt holes 43.

Figure 11:
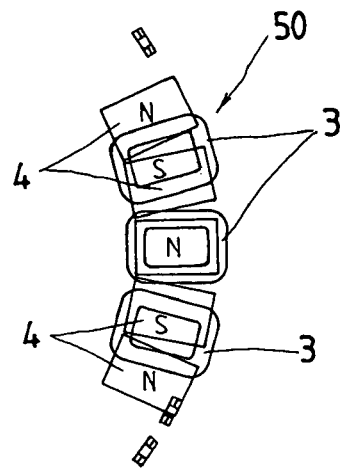
FIGS. 11(A), 11(B) and 11(C) are illustrations explanatory of relative relation of the armature windings with the field magnets when the position control is actuated.
Figure 11:
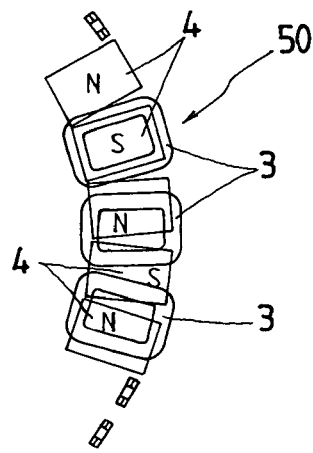
Figure 11:
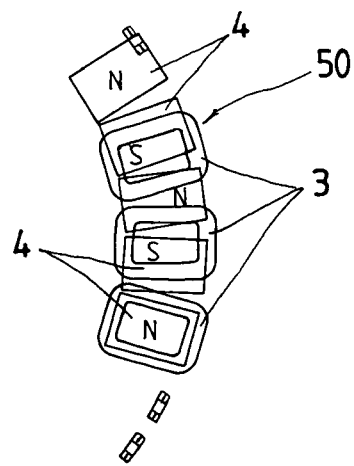

FIG. 11 illustrates relative relation of the armature windings 3 with the field magnets 4, which are the least in number needed to make the linear motor 50 respectively. In FIG. 11(A) there is shown a positional relation of the field magnets 4 relative to the armature windings 3 when the turntable 2 is nearby the origin. FIG. 11(B) shows another positional relation of the field magnets 4 relative to the armature windings 3 after the turntable 2, or the field magnets 4, has circled in anticlockwise direction or upwards in the figure from the position of FIG. 11(A) to a middle area, and FIG. 11(C) is a third positional relation of the field magnets 4 relative to the armature windings 3 after the turntable 2, or the field magnet 4, has further circled in anticlockwise direction or upwards in the figure from the previous position of FIG. 11(B) to an terminal area. Turning in clockwise direction or downwards in the figure of the field magnets 4 is left out in illustration because the relative relation of the field magnets 4 with the armature windings 3 is quite symmetry with the upward turning stated earlier other than the field magnets 4 turn in opposite direction.

Figure 12:
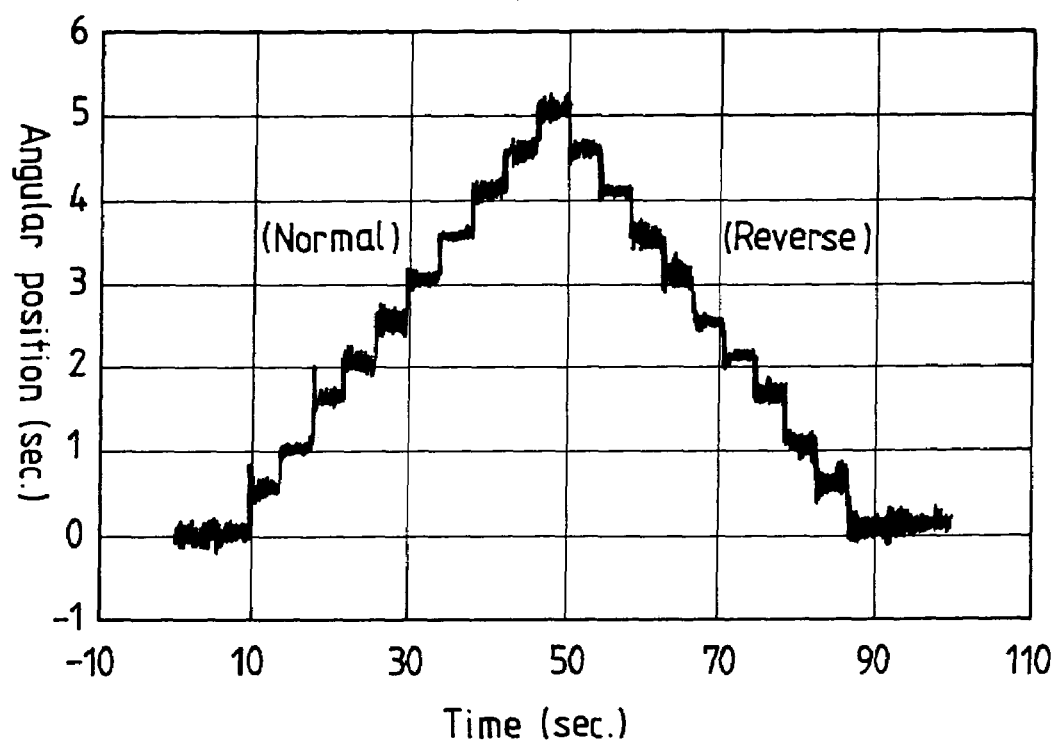
FIG. 12 is a graphic representation showing gauged data of feed and angular position of the turntable.

In FIG. 12, there is gauged data to represent results on operation of the position-control stage with a pair of linear motors 50 that the armature-windings and the field magnets are respectively at least in number as shown in FIGS. 6 and 7. The data in FIG. 12 has been found by gauging a normal turning over an angular position of 5 seconds and a reverse turning over an angular position of 5 seconds in case where the turntable 2 was fed circularly in a stepwise way that the turntable 2 was moved or driven every angular position of 0.5 second (0.5/3600°) and came to rest for every 4 seconds. With the position-control stage of the present invention, moreover, the resolving-power was 0.25 second per one pulse and, therefore, the driving for 0.5 second corresponded to two pulses. Thus, the position-control stage of the present invention helps provide accurate position-control as being clearly understood in FIG. 12.

Accordingly, while the present invention has been disclosed in connection with the preferred embodiments thereof, it should be understood that other embodiments may fall within the spirit and scope of the present invention, as defined by the following claims.

What is claimed is:

1. A position-control stage comprising a bed, a turntable supported for rotation on the bed through a rolling-contact bearing, a linear motor moving the turntable relatively to the bed in a circular direction, and an encoder monitoring a relative position of the turntable to the bed;

wherein the linear motor is comprised of armature windings at a primary side and field magnets at a secondary side;

wherein the armature windings are each made of a three-phase coreless coil where winding turns are wound in a form of flat rectangular loop, are circularly arranged on a disc surface of the bed along a preselected curvature, and lie in radial juxtaposition in circumferential direction;

wherein the field magnets are made in a flat shape and arranged underneath the turntable in such a pattern lying radially on a disc surface of the preselected curvature in opposition to the armature windings, with their unlike poles alternating in polarity along a circular direction;

wherein the linear motor in minimum unit is comprised of three armature windings and five field magnets; and wherein the field magnets are disposed on the disc surface of the turntable throughout an overall circular direction while the armature windings lie on the disc surface of the bed over a preselected area in the circular direction in case where the position-control stage requires large circular angle in relative turning of the turntable to the bed.

2. A position-control stage constructed as recited in claim 1, wherein there is provided a pair of the linear motors made in minimum unit in case where the position-control stage requires less circular angle in relative turning of the turntable to the bed.

3. A position-control stage comprising a bed, a turntable supported for rotation on the bed through a rolling-contact bearing, a linear motor moving the turntable relatively to the bed in a circular direction, and an encoder monitoring a relative position of the turntable to the bed;

wherein the linear motor is comprised of armature windings at a primary side and field magnets at a secondary side;

wherein the armature windings are each made of a three-phase coreless coil where winding turns are wound in a form of flat rectangular loop, are circularly arranged on a disc surface of the bed along a preselected curvature, and lie in radial juxtaposition in circumferential direction;

wherein the field magnets are made in a flat shape and arranged underneath the turntable in such a pattern lying radially on a disc surface of the preselected curvature in opposition to the armature windings, with their unlike poles alternating in polarity along a circular direction; and wherein the field magnets fit in a circular recess cut in an underside of the turntable, and the armature windings lie circularly on a coil support that fits in a circular recess sunken below a top surface of the bed.

4. A position-control stage comprising a bed, a turntable supported for rotation on the bed through a rolling-contact bearing, a linear motor moving the turntable relatively to the bed in a circular direction, and an encoder monitoring a relative position of the turntable to the bed;

wherein the linear motor is comprised of armature windings at a primary side and field magnets at a secondary side;

wherein the armature windings are each made of a three-phase coreless coil where winding turns are wound in a form of flat rectangular loop, are circularly arranged on a disc surface of the bed along a preselected curvature, and lie in radial juxtaposition in circumferential direction;

wherein the field magnets are made in a flat shape and arranged underneath the turntable in such a pattern lying radially on a disc surface of the preselected curvature in opposition to the armature windings, with their unlike poles alternating in polarity along a circular direction;

wherein a linear encoder to monitor any turning position of the turntable relative to the bed is comprised of an optical linear scale surrounding around an outside periphery of the turntable, and a sensor arranged on the bed; and wherein an origin mark is affixed to the underside of the turntable in opposition to the sensor of the bed at a preselected position in the circular direction.

5. A position-control stage comprising a bed, a turntable supported for rotation on the bed through a rolling-contact bearing, a linear motor moving the turntable relatively to the bed in a circular direction, and an encoder monitoring a relative position of the turntable to the bed;

wherein the linear motor is comprised of armature windings at a primary side and field magnets at a secondary side;

wherein the armature windings are each made of a three-phase coreless coil where winding turns are wound in a form of flat rectangular loop, are circularly arranged on a disc surface of the bed along a preselected curvature, and lie in radial juxtaposition in circumferential direction;

wherein the field magnets are made in a flat shape and arranged underneath the turntable in such a pattern lying radially on a disc surface of the preselected curvature in opposition to the armature windings, with their unlike poles alternating in polarity along a circular direction; and wherein a stopper extends below the underside of the turntable while another stopper extends above the top surface of the bed, so that the turntable stops turning after the stopper has come into abutment against the another stopper, and a before the-origin sensor and a limit sensor are installed short of the another stopper on the bed to detect when the stopper on the turntable reaches the sensors.

6. A position-control stage constructed as recited in claim 5, wherein there are provided a power line to convey electric power to the armature windings, a sensor line to signal to the sensors on the bed, and a signal line to receive any signal from the limit sensor and the before-the-origin sensor, and the lines are all clumped together through a cord cover attached to the bed.

7. A position-control stage comprising a bed, a turntable supported for rotation on the bed through a rolling-contact bearing, a linear motor moving the turntable relatively to the bed in a circular direction, and an encoder monitoring a relative position of the turntable to the bed;

wherein the linear motor is comprised of armature windings at a primary side and field magnets at a secondary side;

wherein the armature windings are each made of a three-phase coreless coil where winding turns are wound in a form of flat rectangular loop, are circularly arranged on a disc surface of the bed along a preselected curvature, and lie in radial juxtaposition in circumferential direction;

wherein the field magnets are made in a flat shape and arranged underneath the turntable in such a pattern lying radially on a disc surface of the preselected curvature in opposition to the armature windings, with their unlike poles alternating in polarity along a circular direction; and wherein the turntable is made at a center thereof with an opening for looking into the interior to form a circular support where the turntable is supported for rotation on another circular support of the bed through the rolling-contact bearing.

* * * * *